(12) United States Patent
Schöne

(10) Patent No.: US 12,253,229 B2
(45) Date of Patent: Mar. 18, 2025

(54) ILLUMINATION DEVICE FOR VEHICLES

(71) Applicant: HELLA GMBH & CO. KGAA, Lippstadt (DE)

(72) Inventor: Michael Schöne, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 6 days.

(21) Appl. No.: 18/585,287

(22) Filed: Feb. 23, 2024

(65) Prior Publication Data

US 2024/0230049 A1    Jul. 11, 2024

Related U.S. Application Data

(63) Continuation of application No. PCT/EP2022/072896, filed on Aug. 17, 2022.

(30) Foreign Application Priority Data

Aug. 31, 2021 (DE) .......................... 102021122451.9

(51) Int. Cl.
*F21S 41/20* (2018.01)
*F21S 41/141* (2018.01)

(52) U.S. Cl.
CPC ........... *F21S 41/285* (2018.01); *F21S 41/141* (2018.01)

(58) Field of Classification Search
CPC . F21V 5/05; F21V 7/005; F21S 41/145; F21S 41/337; F21S 41/26; F21S 41/141; F21S 41/285

See application file for complete search history.

(56) References Cited

U.S. PATENT DOCUMENTS 1,686,593 A * 10/1928 Wood ..................... F21V 5/00
                                                              362/215
2,318,716 A *  5/1943 Rolph ..................... F21V 5/04
                                                              362/223

(Continued)

FOREIGN PATENT DOCUMENTS

CN        1737660 A  *  2/2006  ........... G02B 6/0016
CN      118409385 A  *  7/2024

(Continued)

OTHER PUBLICATIONS

Innovation Q+ NPL Search (Year: 2024).*

(Continued)

*Primary Examiner* — Anabel Ton
(74) *Attorney, Agent, or Firm* — WARNER NORCROSS + JUDD LLP

(57) ABSTRACT

The invention relates to a lighting device for vehicles comprising a plurality of light sources, with a lens arranged in front of the light sources in the main emission direction and with an optical element assembly arranged between the light sources and the lens, wherein the optical element assembly is configured as an intermediate lens, which comprises a plurality of prisms on a light entry side facing the light sources for collecting the light emitted by the light sources and which, on a light exit side facing away from the light sources, has a plurality of elevations for scattering the light emerging from the intermediate lens, and the lens is configured as a scattering lens, which has a scattering structure and/or consists of a volume-scattering material on a light entry side facing the intermediate lens and/or on a light exit side facing away from the intermediate lens.

14 Claims, 1 Drawing Sheet

(56) References Cited

U.S. PATENT DOCUMENTS

| | | | | |
|---|---|---|---|---|
| 2,748,263 A | * | 5/1956 | Franck | ...................... F21V 5/02 362/333 |
| 9,726,809 B2 | * | 8/2017 | Sato | ...................... G02B 6/0078 |
| 2021/0062994 A1 | | 3/2021 | Happy | |

FOREIGN PATENT DOCUMENTS

| | | | | |
|---|---|---|---|---|
| DE | 102018129596 A1 | | 5/2020 | |
| DE | 102023110879 A1 | * | 12/2023 | ............ F21S 41/143 |
| EP | 0984220 A1 | | 3/2000 | |
| EP | 2587120 A1 | * | 5/2013 | .......... F21S 48/1154 |
| EP | 3534063 A1 | | 9/2019 | |
| FR | 3045781 A | | 6/2017 | |
| FR | 3101695 A1 | | 4/2021 | |

OTHER PUBLICATIONS

International Search Report of the European Patent Office for application No. PCT/EP2022/072896, mailed Dec. 5, 2022 (6 pages).

\* cited by examiner

ILLUMINATION DEVICE FOR VEHICLES

CROSS-REFERENCE TO RELATED APPLICATIONS

This application is a continuation of PCT/EP2022/072896, filed Aug. 17, 2022, which claims priority to and all advantages of German Patent Application 10-2021-122-451.9, filed Aug. 31, 2021, the contents of which are hereby incorporated by reference in their entirety.

BACKGROUND OF THE INVENTION

The invention relates to an illumination device for vehicles comprising a plurality of light sources, with a lens arranged in front of the light sources in the main emission direction and with an optical element assembly arranged between the light sources and the lens.

An illumination device for vehicles is known from DE-10-2005-031-777A1, in which an optical element is associated with a light source, which optical element has a plurality of prisms on a light entry side facing the light source. The optical element is smoothly configured on a light exit side facing away from the light source. The optical element has a constant wall thickness and is configured to be concave-shaped on the light entry side. Light emitted by the light source enters at one edge of the prism element and is totally reflected at an opposite edge of the same prism element. A parallel light emission takes place on the light exit side. In order to achieve a good uniformity of the emitted luminance, the width of the prisms extending outwards at right angles to a main emission axis of the light source is continuously reduced. It is desirable to improve the degree of uniformity to achieve a homogeneous appearance of the illumination device at low cost.

In order to achieve the homogeneous appearance with a relatively high uniformity of the emitted luminance in a space-saving manner, which is to say, with a minimal construction depth, it is known to arrange a plurality of light sources, in particular LED light sources, next to each other and possibly with the same associated micro-optical elements. Both variants are relatively expensive and complex. An illumination device with light sources that are each assigned micro-optical elements is known, for example, from DE-10-2018-125-438A1.

SUMMARY OF THE INVENTION

The task of the present invention is therefore to further develop an illumination device for vehicles in such a way that a homogeneous appearance and homogeneous illumination at a relatively large distance from the light sources and a minimal construction depth of the illumination device can be ensured at low cost.

To solve this problem, the invention includes an optical element assembly that is configured as an intermediate lens, which comprises a plurality of prisms on a light entry side facing the light sources for collecting the light emitted by the light sources and which, on a light exit side facing away from the light sources, has a plurality of elevations for scattering the light emerging from the intermediate lens, and the lens is configured as a scattering lens, which has a scattering structure and/or consists of a volume-scattering material on a light entry side facing the intermediate lens and/or on a light exit side facing away from the intermediate lens.

The particular advantage of the invention is that a high uniformity of luminance emitted by the illumination device can be achieved at low cost, wherein the number of light sources can be kept relatively low. In addition, the fact that an intermediate lens and a scattering lens can be manufactured relatively inexpensively has a cost-reducing effect. These lenses have a relatively simple construction without having micro-optics. The invention enables flush lighting systems with a homogeneous, uniform appearance, wherein the illumination device can be manufactured using inexpensive tools, preferably by injection molding.

According to the invention, an intermediate lens is provided which has a plurality of prisms on a light entry side and a plurality of elevations on a light exit side. The elevations cause the light collected by the prisms on the light entry side to be scattered. Preferably, the scattering lens arranged in front of the intermediate lens in the direction of the luminous flux is uniformly illuminated. The scattering lens downstream in the direction of luminous flux serves as a light-scattering element, which further improves the uniformity of the light emission.

According to a further development of the invention, the intermediate lens is configured in an arc or alternatively concave-shaped manner on the light entry side, so that a light yield of the light source associated therewith is improved.

According to a further development of the invention, a distance of neighboring light sources lies in the range of a distance of the scattering lens to the light sources, which preferably are in a plane. The plane of the light sources preferably runs parallel to an extension plane of the scattering lens.

Further advantages of the invention result from the embodiment discussed herein.

An embodiment example of the invention is explained in more detail below with reference to the drawings.

BRIEF DESCRIPTION OF THE DRAWINGS

The invention is elucidated in more detail below with reference to the accompanying drawings. Wherein.

DETAILED DESCRIPTION OF THE CURRENT EMBODIMENT

Figure 1:
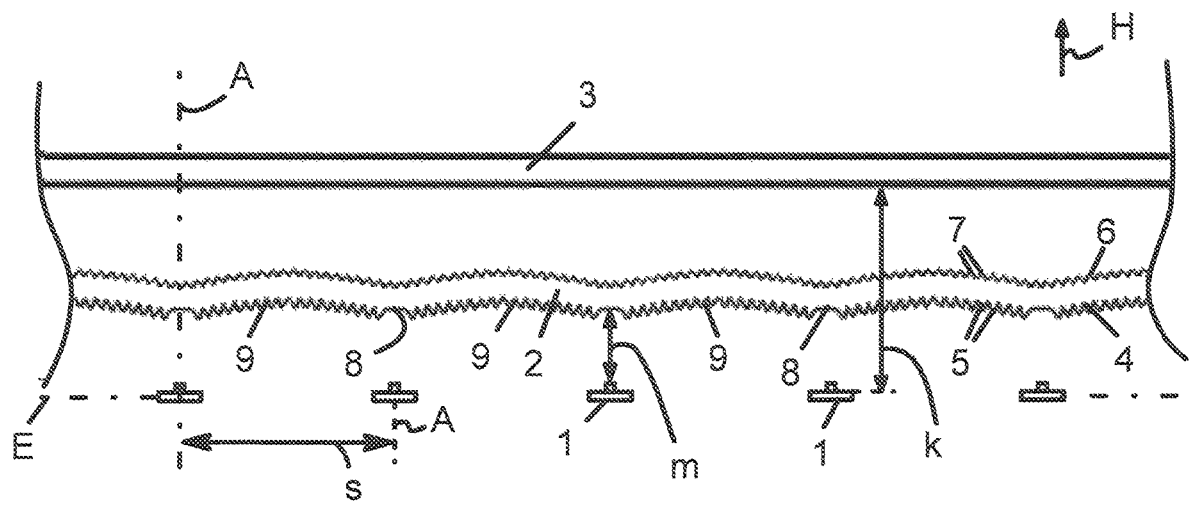
FIG. 1 shows a schematic cross-section of an illumination device according to the invention.
Figure 2:
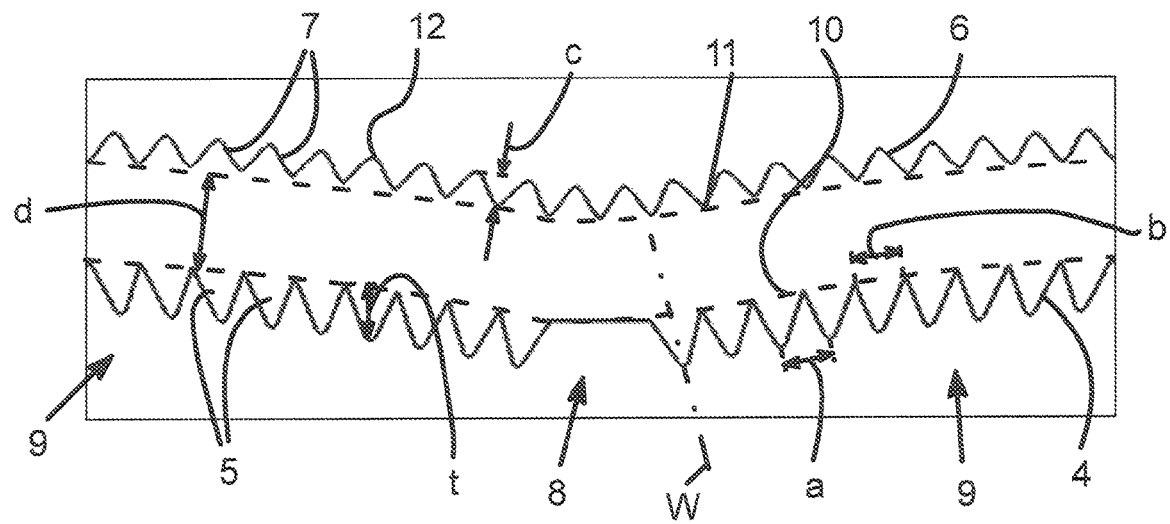
FIG. 2 shows an enlarged section of an intermediate lens of the illumination device according to FIG. 1.

An illumination device for vehicles according to the invention is used to produce a homogeneous appearance with a luminance that is emitted uniformly over the surface.

The illumination device according to the invention is configured as a flat unit with a depth in the range of 25 mm to 35 mm.

The illumination device has a plurality of light sources 1 in an extension plane E, wherein neighboring light sources 1 are preferably arranged at the same distance s. The light sources 1 can be arranged in a matrix and/or according to a grid.

The illumination device moreover has an intermediate lens 2 (optical element assembly) and a scattering lens 3 (lens) in front of the light sources 1 in the main emission direction H. On the one hand, the intermediate lens 2 is arranged between the light sources 1 or alternatively the extension plane E of the light sources 1 and, on the other hand, the scattering lens 3.

The scattering lens 3 serves as a lens from which the homogeneous light of the illumination device is emitted. The intermediate lens 2 is an optical element assembly for pre-shaping and causing the light emitted by the light sources 1 to be uniform.

On a light entry side 4 facing the light sources 1, the intermediate lens 2 has a plurality of prisms 5 for collecting the light emitted by the light sources 1. On a light exit side 6 of the intermediate lens 2 facing away from the light sources 1, a plurality of elevations 7 is arranged to scatter the light coming from the prisms 5.

The scattering lens 3 consists of a volume-scattering material, so that the light impinging on the scattering lens 3 from the intermediate lens 2 is further scattered or alternatively rendered uniform.

According to an embodiment of the invention not shown, the scattering lens 3 can alternatively or additionally have a scattering structuring on a light entry side facing the intermediate lens 2 and/or on a light exit side facing away from the intermediate lens 2.

As can be seen from FIG. 1, the main axes A of the light sources 1 run in the main emission direction H as well as substantially perpendicular to an extension plane of the scattering lens 3.

The intermediate lens 2 comprises a preferably flat section 8 on the light entry side 4 in the area of the main axis A of the light sources 1, which flat section preferably runs perpendicular to the main axis A of the light sources 1. The flat section 8 intersects the main axis A of the light sources 1 arranged behind them in the main emission direction H. A distance m of the light source 1 to the flat section 8 of the intermediate lens 2 is smaller than the distance s of the neighboring light sources 1 to each other. In the present embodiment example, the distance m between the light source 1 and the intermediate lens 2 is in a range between 5 mm and 10 mm, for example 7 mm. The distance s of neighboring light sources 1 is in a range between 15 mm and 25 mm, for example 20 mm.

Prism sections 9, which have a plurality of prisms 5, extend between the neighboring flat sections 8 of the intermediate lens 2 arranged on the light entry side. The prism sections 9 are configured in an arc and/or concave-shaped manner. They have a width b in the range from 0.8 mm to 1.5 mm.

The prisms 5 respectively have a depth t in the range from 0.8 mm to 1.5 mm, for example 1 mm.

The prisms 5 are arranged directly next to each other, so that a distance between tips a of neighboring prisms 5 is in a range of 0.8 mm to 1.5 mm, for example 1 mm.

The prisms 5 respectively have a first flank and a second flank, wherein in relation to a light source 1, light enters at the first flank and light entering at the second flank of the same prism is totally reflected in the direction of the light exit side 6 of the intermediate lens 2. The first flank and the second flank of the prisms 5 are preferably configured in an identical or symmetrical manner with respect to a bisecting angle W.

The prisms 5 each rise up from a first base surface 10 that faces the light sources 1 and the elevations 7 each rise up from a second base surface 11 of the intermediate lens 2 that faces away from the light sources 1. A distance d from the first base surface 10 to the second base surface 11 is preferably constant and lies in a range between two and four millimeters.

The elevations 7 arranged on the light exit side 6 of the intermediate lens 2 are configured in a conical manner with an arc-shaped tip 12. The elevations 7 each form a truncated cone with a casing surface tapering to a tip.

A depth c of the elevations is preferably smaller than a depth t of the prisms 5. The depth c of the elevations can lie in the range between 0.4 mm and 0.6 mm times the depth t of the prisms 5. Alternatively or additionally, the depth c of the elevations 7 can be in the range from 0.4 mm to 0.6 mm.

According to an alternative embodiment of the invention not shown, the elevations 7 can also be configured in a cylindrical manner. According to a further alternative embodiment of the invention, the elevations 7 can also have a tip configured in a flat manner.

As can be seen from FIG. 1, a length of the prism sections 9 projected in a plane arranged perpendicular to the main emission direction H is in the range of a distance s between the neighboring light sources 1 and/or in the range of a distance k from the light sources 1 to the scattering lens 3. The projected length of the prism sections 9 is thus in a range between 15 mm and 25 mm, preferably 20 mm.

Inasmuch as the prism sections 9 have identically configured prisms 5, each prism section 9 can receive light from at least two neighboring light sources 1. The light sources 1 are located at the level of the flat sections 8, wherein the flat sections 8 form an intermediate area between neighboring prism sections 9.

Alternatively, the section 8 can also be configured in a curved and/or structured manner.

The light sources 1 are preferably located on a common flat support, which is located in the extension plane E.

The elevations 7 of the auxiliary lens 2 can optionally be provided with a scattering structure, for example with an erosion structure. In the present embodiment example, the wall thickness of the scattering lens 3, which is to say, the distance between the light entry surface and the light exit surface of the scattering lens, is in the range of 2.5 mm.

The light sources 1 are preferably configured as LED light sources.

LIST OF REFERENCE SIGNS

13 Light sources
14 Intermediate lens
15 Scattering lens
16 Light entry side
17 Prisms
18 Light exit side
19 Elevations
20 Flat section
21 Prism sections
22 $1^{st}$ base surface
23 $2^{nd}$ base surface
24 Tip
E Extension plane
H Main emission direction
A Main axis
W Bisecting angle
a, d, m, s, k Distance
c, t Depth
b Width The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. An illumination device for vehicles comprising a plurality of light sources with a lens arranged in front of the light sources in the main emission direction and with an optical element assembly arranged between the light sources and the lens, wherein:
   the optical element assembly is configured as an intermediate lens, which comprises a plurality of prisms on a light entry side facing the light sources for collecting the light emitted by the light sources and which, on a light exit side facing away from the light sources, has a plurality of elevations for scattering the light emerging from the intermediate lens,
   the lens is configured as a scattering lens, which has a scattering structure or a volume-scattering material on a light entry side facing the intermediate lens or on a light exit side facing away from the intermediate lens, and
   the distance between tips of neighboring prisms is in the range from 0.8 mm to 1.5 mm, and the prisms have a depth in the range from 0.8 mm to 1.5 mm.

2. The illumination device according to claim 1, wherein a width of the prisms is configured identically.

3. An illumination device for vehicles comprising a plurality of light sources with a lens arranged in front of the light sources in the main emission direction and with an optical element assembly arranged between the light sources and the lens, wherein:
   the optical element assembly is configured as an intermediate lens, which comprises a plurality of prisms on a light entry side facing the light sources for collecting the light emitted by the light sources and which, on a light exit side facing away from the light sources, has a plurality of elevations for scattering the light emerging from the intermediate lens,
   the lens is configured as a scattering lens, which has a scattering structure or a volume-scattering material on a light entry side facing the intermediate lens or on a light exit side facing away from the intermediate lens, and
   the elevations respectively comprise a depth that is less than the depth of the prisms.

4. The illumination device according to claim 3, wherein the depth of the elevations is in the range from 0.4 mm to 0.6 mm or in the range from 0.4 mm to 0.6 mm times the depth of the prisms.

5. The illumination device according to claim 1, wherein the elevations project cylindrically or conically from a base surface of the intermediate lens.

6. The illumination device according to claim 1, wherein the elevations have a tip at one free end, which extends in curved shape or flat.

7. The illumination device according to claim 1, wherein a first base surface of the intermediate lens extends on the light entry side and the second base surface extends on the light exit side of the intermediate lens, wherein the first base surface has a constant distance to the second base surface.

8. An illumination device for vehicles comprising a plurality of light sources with a lens arranged in front of the light sources in the main emission direction and with an optical element assembly arranged between the light sources and the lens, wherein:
   the optical element assembly is configured as an intermediate lens, which comprises a plurality of prisms on a light entry side facing the light sources for collecting the light emitted by the light sources and which, on a light exit side facing away from the light sources, has a plurality of elevations for scattering the light emerging from the intermediate lens,
   the lens is configured as a scattering lens, which has a scattering structure or a volume-scattering material on a light entry side facing the intermediate lens or on a light exit side facing away from the intermediate lens, and
   the first base surface of the intermediate lens arranged on the light entry side comprises a flat or curved section or a structured section with a flat surface extending perpendicular to the main axis in the region of a main axis of the light sources extending in the main emission direction.

9. The illumination device according to claim 1, wherein prism sections run between flat sections of the intermediate lens, each of which comprises the prisms.

10. The illumination device according to claim 9, wherein the prism sections extend in a concave shape between the flat sections.

11. The illumination device according to claim 10, wherein a length of the prism section projected in a plane arranged perpendicular to the main emission direction lies in the range of one distance from the light sources to the scattering lens.

12. The illumination device according to claim 11, wherein the projected length of the prism sections is in a range between 15 mm and 25 mm.

13. The illumination device according to claim 1, wherein the light sources are arranged on a common flat support and that the neighboring light sources comprise a distance from each other(s) of 15 mm to 25 mm.

14. The illumination device according to claim 1, wherein the elevations of the intermediate lens are respectively provided with or without a scattering structure.

* * * * *